April 11, 1950 A. VAN DER ZIEL ET AL 2,503,780

MIXER CIRCUIT

Filed April 26, 1946

INVENTORS
ALDERT VAN DER ZIEL &
MAXIMILIAAN JULIUS OTTO STRUTT
BY Fred M Vogel

AGENT

Patented Apr. 11, 1950 2,503,780

UNITED STATES PATENT OFFICE 2,503,780

MIXER CIRCUIT

Aldert van der Ziel and Maximiliaan Julius Otto Strutt, Eindhoven, Netherlands, assignors, by mesne assignments, to Hartford National Bank and Trust Company, Hartford, Conn., as trustee Application April 26, 1946, Serial No. 665,010
In the Netherlands April 16, 1942

Section 1, Public Law 690, August 8, 1946
Patent expires April 16, 1962

6 Claims. (Cl. 250—20)

This invention relates to a circuit arrangement for amplification or frequency transformation of electrical oscillations, which comprises at least one discharge tube and has for its purpose to provide means which permit the noise occurring in such circuits to be reduced.

More particularly in the transmission of weak signals much trouble is experienced due to this noise. It is caused by spontaneous voltage variations (Brown motion of the electrons) in the circuits connected to the discharge tube, and on the other hand by current variations in the discharge tube itself. The last-mentioned current variations are classified as emission variations (irregularities in the emission-current of a cathode) and distribution variations (irregularities in the current distribution between two or more current carrying electrodes). The noise due to the two last-mentioned causes is called cathode-noise and distribution noise respectively.

In screen-grid tubes the distribution noise is generally much stronger than the cathode noise. In this respect it is to be remarked that the distribution noise current in the anode circuit is equal and opposite to the distribution noise current in the screen-grid circuit and this since each random increase in anode current involves a similar decrease of the screen-grid current. Consequently the distribution noise manifests itself as an alternating current which flows from the anode to the screen grid but does not appear in the cathode lead. Hence in screen-grid tubes the signal to noise ratio in the cathode lead is much larger than in the anode circuit.

Frequency-transformation circuits generally exhibit a stronger noise than amplifying circuits realised with corresponding tubes and this since the conversion slope is much smaller than the slope occurring in amplification, so that the frequency-transformed output signal with equal input voltage and output impedance is always smaller than the output signal occurring in amplification. Owing to this the signal to noise ratio in the output circuit for the transformed frequency is always smaller than for the frequency to be transformed. When the mixing tube used for frequency transformation comprises one or more screen grids, as is customary, the above statement in regard to screen-grid tubes holds, viz., that the signal to noise ratio in the output circuit both for the transformed frequency and for the frequency to be transformed is always smaller than in the cathode lead.

The above-mentioned recognitions are utilised by the invention to obtain a considerable decrease of the noise occurring in amplifying and frequency transformation circuits.

According to the invention, in an amplifying circuit comprising at least one screen-grid tube a positive and a negative backcoupling is simultaneously used for the signal to be amplified, the backcoupling current or backcoupling voltage for the positive backcoupling being taken from the circuit of a current carrying electrode, in which the signal to noise ratio is larger than in the output circuit, the backcoupling current or back-coupling voltage for the negative backcoupling being taken from the output circuit.

Furthermore, according to the invention, in a frequency transformation circuit comprising at least one discharge tube a positive and a negative backcoupling is simultaneously used for the frequency band occupied by the signal whose frequency is to be transformed, the backcoupling current or backcoupling voltage for the positive backcoupling being taken from the circuit of a current carrying electrode, in which the signal to noise ratio for the said frequency band is larger than the signal to noise ratio for the frequency band in the output impedance which is occupied by the frequency-transformed signal, the backcoupling current or backcoupling voltage for the negative backcoupling being taken from the output impedance through the intermediary of a second frequency transformation stage.

The invention will be more fully explained by reference to the accompanying drawing in which.

Figure 1:
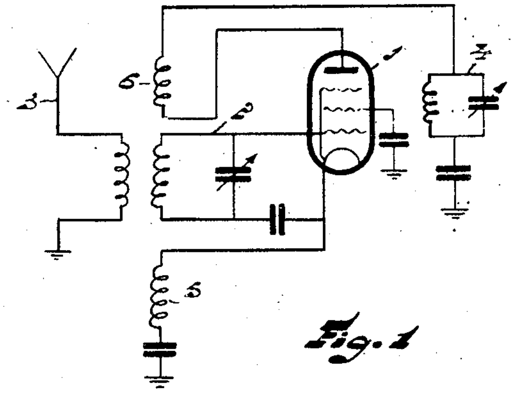
Figure 1 shows an amplifier circuit arrangement according to the invention.

Fig. 1 represents an amplifying circuit comprising a pentode 1. The control-grid circuit of this pentode comprises a resonant circuit 2 to which is supplied the signal to be amplified which is taken, for instance, from an antenna 3. The amplified signal is taken from a resonant circuit 4 interposed in the anode circuit. For the sake of simplicity the direct current connections have been omitted in the figure.

According to the invention two backcouplings are used simultaneously viz. a positive backcoupling by means of a backcoupling coil 5 interposed in the cathode lead and coupled with the input circuit 2, and a negative backcoupling by means of a backcoupling coil 6 which is interposed in the anode circuit and also coupled with the circuit 2.

The operation of the circuit referred to is as follows. As has already been stated above, solely a noise current flows in the cathode lead owing to the emission variations of the cathode. In the anode circuit, however, a noise current flows moreover, which is caused by the variations of the current distribution between anode and screen-grid, which distribution noise current is generally much stronger than the cathode noise current. Owing to this the signal to noise ratio in the anode circuit is much smaller than in the cathode lead.

Owing to the positive backcoupling by means of the coil 5 the signal appearing in the input circuit 2 is highly increased. At the same time a noise voltage correlated with the cathode noise is induced in the input circuit 2, which voltage leads to an increase of the noise current in the output circuit. Consequently both the signal current and the cathode noise current in the anode circuit will increase due to the positive backcoupling and this, as appears from calculation, to the same degree. However, the distribution noise current in the anode circuit is not affected by the positive backcoupling, so that the ratio between signal current and cathode-noise current has remained equal, but the ratio between signal current and distribution noise current has materially increased so that the resulting signal to noise ratio has become much larger. If the positive backcoupling is made very strong the signal to noise ratio in the anode circuit approaches that in the cathode lead, in other words the noise in the input circuit 4 is solely determined by the cathode noise, whereas the influence of distribution noise exists no longer. It will be obvious that in this way a great progress is obtained.

However, the positive backcoupling described above causes strong undamping of the input circuit 2 due to which the width of the transmitted frequency band is limited on the one hand, and on the other hand there is a risk of self-oscillation. Even when the positive backcoupling is effected in such manner that the circuit 2 is not undamped thereby the stability of the circuit will be jeopardized. To avoid these drawbacks a negative backcoupling is simultaneously used, for instance by means of the coil 6. This backcoupling reduces the damping of the input circuit 2 to a suitable value, but at the same time the signal voltage set up across this circuit is reduced. Owing to this the signal to noise ratio would attain again its initial value; however, the coil 6 induces at the same time a noise voltage in the circuit 2, which voltage reduces the noise current in the anode circuit to the same degree as the signal current. Since the coil 6 is interposed in the anode circuit the noise voltage induced in the circuit 2 comprises both a component correlated with the cathode noise and a component correlated with the cathode noise and a component correlated with the distribution noise, so that the signal current, the distribution noise current and the cathode noise current in the anode circuit are all decreased to the same extent. The favourable signal to noise ratio in the anode circuit obtained by means of the positive backcoupling is consequently not altered by the negative backcoupling, so that a large decrease in noise is obtained without the risk of self-oscillation and without limitation of the transmitted frequency band.

Preferably the two backcouplings are so proportioned that the damping of the input circuit 2 caused by the negative backcoupling is equal to the undamping involved by the positive backcoupling.

Figures 2, 3:
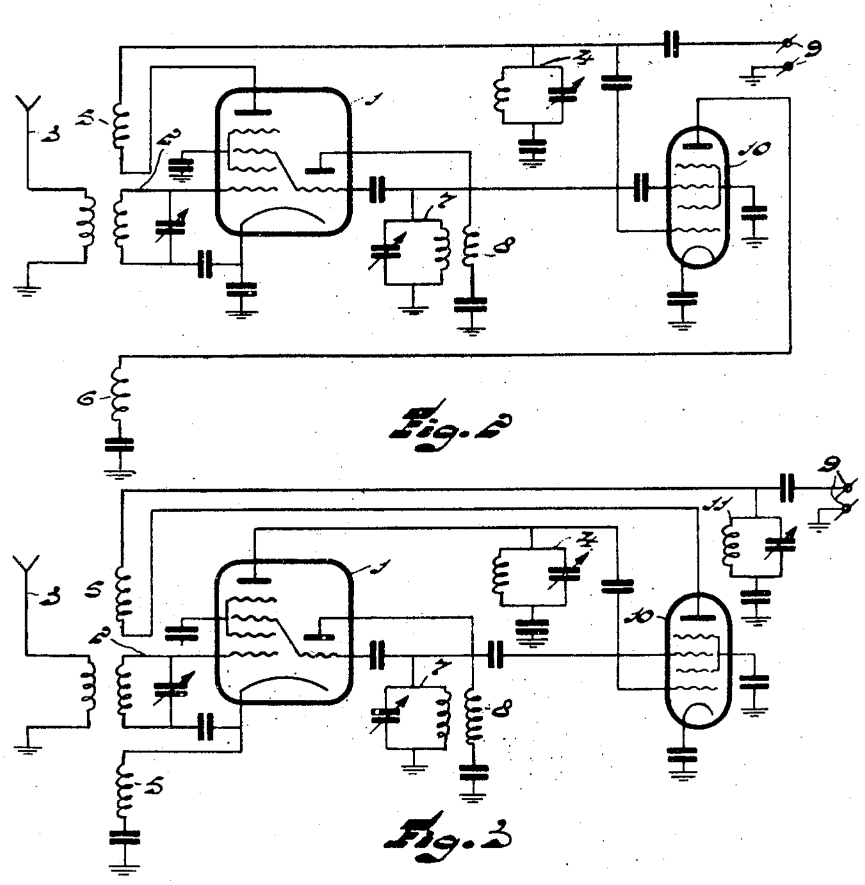
Figure 2 shows a frequency transformation circuit according to the invention.
Figure 3 shows a modification of the arrangement shown in Figure 2.

Fig. 2 represents a frequency transformation circuit according to the invention: This circuit comprises a triode-hexode 1, in which the signal whose frequency is to be transformed is supplied in the usual way through the input circuit 2 to the inner most control grid of the hexode portion. Furthermore, the outer control grid is connected to the control grid of the triode portion as a result of which local oscillations are generated. The latter takes place in the usual way by means of a resonant circuit 7 interposed in the control grid circuit of the triode portion, which resonant circuit is coupled with a backcoupling coil 8 interposed in the anode circuit. The signal whose frequency is transformed is taken from intermediate frequency circuit 4 inserted in the anode circuit of the hexode portion and supplied to an intermediate frequency amplifier through the connecting terminals 9.

According to the invention a positive and a negative backcoupling is simultaneously used for the frequency of the received signal, the positive backcoupling taking place by means of a backcoupling coil 5 and the negative backcoupling being effected by means of a backcoupling coil 6. The coil 5 is interposed in the anode circuit of the hexode portion in the tube 1.

The intermediate frequency oscillations appearing in the circuit 4 are supplied to the innermost control grid of a hexode 10, the local oscillations generated by the triode portion of the tube 1 being supplied to the outmost control grid of this hexode. Owing to this the intermediate frequency oscillations produced in the circuit 4 are transformed again in the tube 10 to the frequency of the incoming oscillations, the oscillations having the received frequency, which are produced in the anode circuit of the tube 10, being supplied to the input circuit 2 by means of the backcoupling coil 6 in such a phase as to obtain a negative backcoupling.

It is not necessary that for the second frequency transformation by means of the hexode 10 the same source of local oscillations is used as for the first frequency transformation. However, a fixed phase ratio must exist between the local voltages used for the two frequency transformations.

The operation of the circuit described above is as follows. As has already been set out above the signal to noise ratio in the anode circuit for the frequency of the received signal is much larger than for the transformed frequency (intermediate frequency). Owing to the positive backcoupling by means of the coil 5 the signal appearing across the input circuit 2 is strongly amplified. At the same time a noise voltage is induced in the circuit 2 which voltage involves an increase of the high frequency noise current in the anode circuit of the hexode portion, but to the same degree as the signal current. Consequently, the comparatively favourable signal to noise ratio, which was available in the anode circuit for the frequency of the received signal, is not spoiled by the backcoupling. The intermediate frequency current produced by frequency transformation of the high-frequency signal current and the noise current also exhibits the same favourable signal to noise ratio, but is much stronger than would be the case without positive backcoupling.

Moreover, an intermediate frequency noise current flows in the anode circuit of the hexode portion, which noise current is formed by the part of the cathode noise and distribution noise spectrum falling within the frequency band occupied by the intermediate frequency signal. This intermediate frequency noise current is not affected by the positive backcoupling so that it will be appreciated that the signal to noise ratio of the signal appearing across the output circuit 4 is much larger than it would be the case without positive backcoupling. If the positive backcoupling is made very strong the signal to noise ratio of the intermediate frequency voltage set up across the circuit 4 approaches to that of high frequency current in the anode circuit of the hexode portion.

Similarly to the circuit shown in Fig. 1 the undamping of the circuit 2 caused by the positive backcoupling must be made up for by a negative backcoupling in order to prevent self-oscillation of limitation of the transmitted frequency band, which negative backcoupling must be realised in such manner that the suitable signal to noise ratio obtained is not spoiled again. To this end, just as it was the case in the circuit according to Fig. 1, all of the noise components appearing in the output circuit 4 must be decreased to the same degree as the signal, consequently inclusive of the above-mentioned intermediate frequency component of the cathode noise and distribution noise spectrum. This is possible by using the intermediate frequency voltage set up across the circuit 4 to constitute the backcoupling voltage, which intermediate frequency voltage is reduced for this purpose to the frequency of the incoming oscillations by means of the hexode 10. In this respect it is to be remarked that the intermediate frequency signal set up across the circuit 4 is so strong in practice that the noise caused by the tube 10 does no longer play a part.

Fig. 3 represents a circuit which is different from the circuit shown in Fig. 2 in that the backcoupling coil 5 is inserted in the cathode lead of the mixing tube 1. Thus the advantage is obtained that similarly to the circuit shown in Fig. 1 the current distribution variations caused by the screen grids of the hexode part are made ineffective.

Moreover, in the circuit shown in Fig. 3 an additional discharge tube is saved by using the hexode 10 to constitute at the same time the intermediate frequency amplifying tube, to which end an intermediate frequency circuit 11 is inserted in the anode circuit of this hexode.

In the circuits shown in Figures 2 and 3 a voltage having the oscillator frequency is generally induced at the same time in the circuit 2 by the backcoupling 5. This voltage, which is of the same order of magnitude as the voltage having the oscillator frequency transmitted to the circuit 2 through the internal tube capacities, may sometimes give rise to radiation of local oscillations. When the incoming frequency and the oscillator frequency are very different from each other the risk thereof is not great, since in this case owing to the selectivity of the circuit 2, only a low voltage having the oscillator frequency can develop across this circuit. If, however, the frequency difference between the received oscillations and the local oscillations is comparatively small, it may be advisable to neutralise the voltage having the oscillator frequency set up across the circuit 2 which may for instance take place in a known manner by supplying a compensation voltage taken from the anode of the triode portion with a suitable phase to the innermost control grid of the hexode part of the tube 1.

We claim:

1. A circuit arrangement for the frequency transformation of a signal voltage of given frequency to a signal voltage of desired frequency, comprising an electron discharge tube having a cathode electrode, a control grid, a further grid electrode and an anode electrode, means to apply said signal voltage of given frequency to the control grid of said tube, means to apply a voltage of frequency equal to the frequency difference between said given frequency and said desired frequency to the further grid electrode of said tube, a resonant circuit tuned to said desired frequency and coupled to the anode of said tube to derive a signal voltage of said desired frequency, means coupled to said resonant circuit to derive a first voltage of said given frequency, means to combine said derived first voltage of said given frequency with said signal voltage of said given frequency in positive feedback relationship, means coupled to one of the electrodes of said tube to derive a second voltage of said given frequency, and means to combine said second derived voltage of given frequency with said signal voltage of given frequency in negative feedback relationship.

2. A circuit arrangement for the frequency transformation of a signal voltage of given frequency to a signal voltage of desired frequency, comprising an electron discharge tube having a cathode electrode, a control grid, a further grid electrode and an anode electrode, a first resonant circuit tuned to said given frequency, means to couple said first resonant circuit to the control grid of said tube, means to apply said signal voltage of given frequency to said first resonant circuit, means to apply a voltage of frequency equal to the frequency difference between said given frequency and said desired frequency to the further grid electrode of said tube, a second resonant circuit tuned to said desired frequency and coupled to the anode of said tube to derive a signal voltage of said desired frequency, means coupled to said second resonant circuit to derive a first voltage of said given frequency, means coupled to said first resonant circuit to combine said first derived voltage of said given frequency with said signal voltage of said given frequency in positive feedback relationship, means coupled to one of the electrodes of said tube to derive a second voltage of said given frequency, and means coupled to said first resonant circuit to combine said second derived voltage of given frequency with said signal voltage of given frequency in negative feedback relationship.

3. A circuit arrangement for the frequency transformation of a signal voltage of given frequency to a signal voltage of desired frequency, comprising a first electron discharge tube having a cathode, a control grid, a further grid and an anode, a first resonant circuit tuned to said given frequency, means to couple said first resonant circuit to the control grid of said first tube, means to apply said signal voltage of given frequency to said first resonant circuit, means to apply a locally generated voltage of frequency equal to the frequency difference between said given frequency and said desired frequency to the further grid of said first tube, a second resonant circuit tuned to said desired frequency and coupled to the anode of said first tube to derive a signal voltage of said desired frequency, a second electron discharge tube having a cathode, a first control grid, a second control grid and an anode, means to couple the first control grid of said second tube to the anode of said first tube, means to apply said locally generated voltage to the second control grid of said second tube to produce at the anode thereof a first voltage of said given frequency, means to combine said first voltage of said given frequency with said signal voltage of said given frequency in positive feedback relationship, means coupled to one of the electrodes of said first tube to derive a second voltage of said given frequency, and means to combine said second derived voltage of given frequency with said signal voltage of given frequency in negative feedback relationship.

4. A circuit arrangement for the frequency transformation of a signal voltage of given frequency to a signal voltage of desired frequency, comprising a first electron discharge tube having a cathode, a control grid, a further grid and an anode, a first resonant circuit tuned to said given frequency, means to couple said first resonant circuit to the control grid of said first tube, means to apply said signal voltage of given frequency to said first resonant circuit, means to apply a locally generated voltage of frequency equal to the frequency difference between said given frequency and said desired frequency to the further grid of said first tube, a second resonant circuit tuned to said desired frequency and coupled to the anode of said first tube to derive a signal voltage of said desired frequency, a second electron discharge tube having a cathode, a first control grid, a second control grid and an anode, means to couple the first control grid of said second tube to the anode of said first tube, means to apply said locally generated voltage to the second control grid of said second tube to produce at the anode thereof a first voltage of said given frequency, means to combine said first voltage of said given frequency with said signal voltage of said given frequency in positive feedback relationship, means coupled to one of the electrodes of said first tube to derive a second voltage of said given frequency, and means to combine said second derived voltage of given frequency with said signal voltage of given frequency in negative feedback relationship, said first and said second derived voltages having values at which the damping of the grid circuit of said first tube is substantially unaltered.

5. A circuit arrangement for the frequency transformation of a signal voltage of given frequency to a signal voltage of desired frequency, comprising a first electron discharge tube having a cathode, a control grid, a further grid and an anode, a first resonant circuit tuned to said given frequency, means to couple said first resonant circuit to the control grid of said first tube, means to apply said signal voltage of given frequency to said first resonant circuit, means to apply a locally generated voltage of frequency equal to the frequency difference between said given frequency and said desired frequency to the further grid of said first tube, a second resonant circuit tuned to said desired frequency and coupled to the anode of said first tube to derive a signal voltage of said desired frequency, a second electron discharge tube having a cathode, a first control grid, a second control grid and an anode, means to couple the first control grid of said second tube to said second resonant circuit, means to apply said locally generated voltage to the second control grid of said second tube to produce at the anode thereof a first voltage of said given frequency, inductive means to combine said first voltage of said given frequency with said signal voltage of said given frequency in positive feedback relationship, means interposed between the anode of said first tube and said second resonant circuit to derive a second voltage of said given frequency, and inductive means to combine said second derived voltage of given frequency with said signal voltage of given frequency in negative feedback relationship.

6. A circuit arrangement for the frequency transformation of a signal voltage of given frequency to a signal voltage of desired frequency, comprising a first electron discharge tube having a cathode, a control grid, a further grid and an anode, a first resonant circuit tuned to said given frequency, means to couple said first resonant circuit to the control grid of said first tube, means to apply said signal voltage of given frequency to said first resonant circuit, means to apply a locally generated voltage of frequency equal to the frequency difference between said given frequency and said desired frequency to the further grid of said first tube, a second resonant circuit tuned to said desired frequency and coupled to the anode of said first tube to derive a signal voltage of said desired frequency, a second electron discharge tube having a cathode, a first control grid, a second control grid and an anode, means to couple the first control grid of said second tube to the anode of said first tube, means to apply said locally generated voltage to the second control grid of said second tube to produce at the anode thereof a first voltage of said given frequency, inductive means to combine said first voltage of said given frequency with said signal voltage of said given frequency in positive feedback relationship, means interposed in the cathode circuit of said first tube to derive a second voltage of said given frequency, inductive means to combine said second derived voltage of given frequency with said signal voltage of given frequency in negative feedback relationship, and a third resonant circuit coupled to the anode of said second tube to derive therefrom an amplified signal voltage of said desired frequency.

ALDERT VAN DER ZIEL.
MAXIMILIAAN JULIUS OTTO STRUTT.

REFERENCES CITED

The following references are of record in the file of this patent:

UNITED STATES PATENTS

| Number | Name | Date |
|---|---|---|
| 1,931,338 | Wheeler | Oct. 17, 1933 |
| 2,122,283 | Harris | June 28, 1938 |
| 2,315,043 | Boucke | Mar. 30, 1943 |